(12) United States Patent
Day et al.

(10) Patent No.: US 6,393,184 B1
(45) Date of Patent: May 21, 2002

(54) OPTICAL LINK BETWEEN ELECTRICAL CIRCUIT BOARDS

(75) Inventors: Ian E. Day, Old Headington; Arnold Peter Roscoe Harpin, Boars Hill, both of (GB)

(73) Assignee: Bookham Technology PLC, Oxfordshire (GB)

( * ) Notice: Subject to any disclaimer, the term of this patent is extended or adjusted under 35 U.S.C. 154(b) by 0 days.

(21) Appl. No.: 09/281,972

(22) Filed: Mar. 31, 1999

Related U.S. Application Data

(63) Continuation-in-part of application No. 09/019,729, filed on Feb. 6, 1998, now Pat. No. 6,108,472.

(30) Foreign Application Priority Data

Apr. 20, 1998 (GB) .............................................. 9807109

(51) Int. Cl.$^7$ ................................................. G02B 6/30
(52) U.S. Cl. ........................... 385/49; 385/14; 359/163
(58) Field of Search ..................... 385/49, 14; 359/163, 359/152; 257/79, 82

(56) References Cited

U.S. PATENT DOCUMENTS

| 5,354,709 A | * 10/1994 | Lorenzo et al. ............. 437/129 |
| 5,355,237 A | * 10/1994 | Lang et al. .................... 385/14 |
| 5,612,968 A | 3/1997 | Zah .............................. 372/50 |
| 5,960,135 A | * 9/1999 | Ozawa ......................... 385/14 |

FOREIGN PATENT DOCUMENTS

| EP | 0 501 751 | 9/1992 |
| EP | 0 593 287 A1 | 4/1994 |
| GB | 2 245 080 A | * 12/1991 |
| GB | 2 315 595 A | * 2/1998 |

* cited by examiner

Primary Examiner—Frank G. Font
Assistant Examiner—Roy M Punnoose
(74) Attorney, Agent, or Firm—Fleshner & Kim, LLP

(57) ABSTRACT

A method of providing a point to point connection between two electrical circuit boards (23, 23') in which a plurality of pairs of optical transceivers are provided, one transceiver of each pair being formed on a first silicon-on-insulator chip (2) in electrical contact with a first electrical circuit board (23), and the other transceiver of each pair being formed on a second silicon-on-insulator chip (2') in electrical contact with a second electrical circuit board (23'). Each optical transceiver comprises a branched rib waveguide comprising a common stem (10, 26) and first and second branches (14, 12) extending from the common stem (10, 26); a fiber connector (20) for receiving an optical fiber (22) in communication with the stem (10, 26) of the branched rib waveguide; a light source (4) in communication with the first branch (14) of the branched rib waveguide; and a light receiver (6) in communication with the second branch (12) of the branched rib waveguide. Each pair of transceivers is linked by an optical fiber (22) connected to the stem (10, 26) of the branched rib waveguide of the first transceiver and to the stem (10', 26) of the branched rib waveguide of the second transceiver.

15 Claims, 4 Drawing Sheets

OPTICAL LINK BETWEEN ELECTRICAL CIRCUIT BOARDS

This application is a continuation-in-part of U.S. application Ser. No. 09/019,729, filed Feb. 6, 1998, now U.S. Pat. No. 6,108,472, which in turn claims priority to U.K. Patent Application No. GB 2 315 595 A.

TECHNICAL FIELD

This invention relates to the connection of two or more electrical circuit boards, and in particular to the connection of two or more electrical circuit boards using optical components.

BACKGROUND ART

The use of electrical circuit boards, for example integrated electronic circuits printed on silicon, i.e. so-called PCBs (printed circuit boards) is very well known. There is frequently a need to form connections between the boards, to allow data communication across them. A typical connection is a "point to point" connection. This, as its name suggests, connects between one point on one board to another point on the other board.

Traditionally, point to point connections have been made by copper wires, arranged to extend between the contact points on the boards that are to be connected. Such copper wires may be provided as a module, e.g. mounted on an interface card, which can be clipped directly in place between the circuit boards.

More recently, it has been proposed to use optical components, in particular optical transceivers to provide the data connection between two electrical circuit boards. A pair of optical transceivers is used, each typically being provided on a module that can be soldered to its respective circuit board. The first transceiver translates electrical data from the first circuit board to optical data, and transmits it via an optical fiber link to the second of the pair of transceivers. This converts the data to electrical form for the second circuit board. The second transceiver similarly provides its own optical fiber link to the first transceiver, to transmit data in the reverse direction. Thus, two optical fibres are provided between the pair of transceivers, and the data link along each fibre is unidirectional. The use of optical transceivers to provide a point to point link between electrical circuit boards has a number of advantages compared to the traditional copper wire link. In particular, data transmission can be of the order of gigabits/second (Gbps) with significantly reduced cross talk compared to copper wire links. Also the optical transceivers are more compact than the traditional copper links.

Using the known optical transceiver point to point links, parallel data (e.g. 16 bits wide at a clock speed of 50 MHz) is generally serialised, and encoded before optical transmission. Using the above known transceiver pair/optical fibre pair link, it is possible to transmit data of the order of Gbps. If higher transmission rates are required, then modules must be stacked in some way. This is not generally possible, in most circuit board layout systems. Data transmission rates are therefore limited.

It is also known to use optical transceivers, for point to point circuit board links, in which the transceivers use vertical cavity surface emitting lasers (VCSELs) to act as an optical source, and multimode ribbon optical fibre to connect between the transceivers. The VCSELs allow an army of lasers to be mounted side by side so that a plurality of signals can be provided. These are transmitted along the ribbon fibre. The use of a laser array and multiple (ribbon) fibre allows high bandwidths to be achieved. However, since they use VCSELs as the light source, the light must be coupled into a 90° C. plane for transmission between the boards. In one known solution, this is achieved by coupling the lasers to a polymer waveguide, which is bent the required 90° C. before coupling into the optical fibre. This is expensive.

DISCLOSURE OF INVENTION

We have discovered another method and module for providing an optical point to point connection between two electrical circuit boards.

A first aspect of the present invention provides a method of providing a point to point connection between two electrical circuit boards comprising:

(i) providing a pair of optical transceivers, each formed on a silicon-on-insulator chip and each being in electrical contact with one of the said circuit boards, each optical transceiver comprising:
   (a) a branched rib waveguide comprising a common stem and first and second branches extending from the common stem;
   (b) fibre connection means for receiving an optical fibre, and being in communication with the stem of the branched rib waveguide;
   (c) a light source for providing optical signals, the light source being in communication with the first branch of the branched rib waveguide; and
   (d) a light receiver in communication with the second branch of the branched rib waveguide; and
(ii) providing a single optical fibre linking the stem of the branched rib waveguide of the first transceiver to the stem of the branched rib waveguide of the second transceiver.

An advantage of the method of the present invention, compared to the transceiver pair link of the prior art, is that only a single optical fibre is provided to link the two transceivers. This is made possible because of the manner in which the laser and receiver photodiode are provided at the terminus of branches of a rib waveguide in a silicon layer, which branches extend from a common stem. According to the invention, therefore, traffic, between the transceivers of the pair, is bidirectional, along the common linking optical fibre. Since bi-directional transmission is used, the number of fibres required to achieve a given bandwidth is half that of comparable prior art devices, e.g. of comparable VCSEL devices. Also since the number of fibres is halved compared to prior art devices, the number of optical fibre connectors required is also halved. Connector costs are generally a significant proportion of the cost of fibre optic devices, and hence this advantageously results in cost savings.

Furthermore, integration of components on a silicon-on-insulator chip significantly simplifies fabrication of the devices and so reduces the cost.

Each transceiver preferably also comprises a monitor photodiode in communication with the laser, via another optical waveguide formed on the chip. This monitor photodiode acts to monitor proper functioning of the laser.

Where optical components are said to be "in communication" with each other in this specification, it is intended that the components are in optical communication with each other.

The light source is preferably a laser, and the light receiver(s) are preferably photodiode(s). Methods of mounting light sources and light receivers on a silicon-on-insulator chip are described in U.S. Pat. No. 5,881,190 and U.S. Ser. No. 09/019,729, the disclosures of which are incorporated herein by reference.

The said fibre connection means preferably comprises a groove formed in the silicon-on-insulator chip. The use of such connection means is described in W0 97/43676, the disclosure of which is incorporated herein by reference, A V-groove is preferably etched into the silicon using a crystallographically dependent wet etch and the waveguide preferably arranged to extend out over the end of the etched-V-groove so as to abut with an optical fibre located in the V-groove for communication with the waveguide.

The rib waveguide is formed by an etching technique to leave an upwardly projecting rib in the silicon layer, which can be appropriately sized to act as a waveguide, preferably, but not necessarily, a single mode waveguide. The insulating layer beneath the silicon layer is preferably silicon dioxide. The substrate layer beneath the silicon dioxide layer is preferably silicon. Silicon on insulator rib waveguide devices are known, and are described, for example in U.S. Pat. No. 5,757,986 and other references given therein, the disclosures of which are incorporated herein by reference.

In a preferred embodiment, the method comprises providing a plurality of said pairs of optical transceivers, one of each pair being provided on a first silicon-on-insulator chip, and the other of each pair being provided on a second silicon-on-insulator chip. Preferably each pair of the plurality of pairs of transceivers are connected by respective fibres in a ribbon fibre array. In other words, two silicon on insulator chips are preferably provided, into each of which are etched and hybridised the component parts of one of each of the pairs of transceivers; the two silicon chips being interconnected by a ribbon fibre optic cable. This embodiment is especially preferred since it allows many transceivers to be hybridised onto a single silicon-on-insulator chip.

The use of a silicon-on-insulator chip incorporating a plurality of optical transceivers is novel per se.

Therefore, a second aspect of the present invention provides an optical module comprising a plurality of optical transceivers formed on a silicon-on-insulator, each transceiver comprising:

(a) a branched rib waveguide comprising a common stem and first and second branches extending from the common stem;

(b) fibre connection means comprising a groove formed in the chip for receiving an optical fibre, and being in communication with the stem of the branched rib waveguide;

(c) a light source for providing optical signals, the light source being in communication with the first branch of the branched rib waveguide; and (d) a light receiver in communication with the second branch of the branched rib waveguide;

wherein the stems of the plurality of transceivers extend across the chip to the fibre connection means which are provided at spaced apart locations along an edge of the chip.

Preferably the optical module of the second aspect of the invention is used in combination with a ribbon comprising a plurality of optical fibres, wherein respective ones of the fibres of the ribbon extend into respective fibre connection means provided along the edge of the chip.

In especially preferred methods and optical modules according to the present invention, wavelength division multiplexing (WDM) means are also incorporated into the silicon layer. WDM is the use of different colours (wavelengths) of light to send many signals over the same optical fibre. By providing light signals of different wavelengths and transmitting them over a single fibre, WDM provides multiple information carrying channels. A multi-wavelength light source such as a superluminescent laser diode (SLD) with a broad spectrum output may be used. The output is split into a plurality of relatively narrow wavelength bands and then modulated with the signal to be transmitted. Alternatively, a plurality of separate light sources, such as laser diodes, with well-defined outputs of different wavelengths may be used. The incorporation of WDM means in the device reduces the number of fibres required for a given bandwidth, or alternatively, for a given number of fibres, increases the total bandwidth that can be transmitted. Incorporation of a WDM means into a transceiver is known, and an example of such a device comprising a transmission grating is described in U.S. Ser. No. 9/083,175, the disclosure of which is incorporated herein by reference.

While a significant advantage of the present invention compared to the prior art is that a single fibre is needed for both transmit and receive paths (bidirectional traffic), it is also envisaged that separate fibres might be used for transmitting and receiving, and the appropriate modifications made to the positioning of the waveguides on the chip.

A third aspect of the invention therefore provides a method of making a point to point connection between two electrical circuit boards comprising:

(i) providing a pair of optical transceivers, each formed on a silicon-on-insulator chip and each being in electrical contact with one of the said circuit boards, each optical transceiver comprising:

(a) two rib waveguides;

(b) two fibre connection means for receiving optical fibres, and being in communication with respective ones of the rib waveguides;

(c) a light source, for providing optical signals, the light source being in communication with the first rib waveguide; and (d) a light receiver in communication with the second rib waveguide; and (ii) providing two optical fibres, one linking the first rib waveguide of the first transceiver to the second rib waveguide of the second transceiver, and the other linking the second rib waveguide of the first transceiver to the first rib waveguide of the second transceiver.

Similarly, an optical module with a plurality of such transceivers is also envisaged. Thus, a fourth aspect of the invention provides an optical module comprising a plurality of optical transceivers formed on a silicon-on-insulator chip, each transceiver comprising:

(a) two rib waveguides;

(b) two fibre connection means formed in the chip for receiving an optical fibre, and being In communication with respective ones of the rib waveguides;

(c) a light source, for providing optical signals, the light source being in communication with the first rib waveguide; and (d) a light receiver in communication with the second rib waveguide;

wherein the rib waveguides of the transceivers extend across the chip to the fibre connection means which are provided at spaced apart locations along an edge of the chip.

The invention also relates to a pair of optical modules as detailed above connected to first and second circuit boards, respectively, and connected to each other by one or more optical fibres.

The invention also relates to a kit of parts comprising at least one pair of optical modules as detailed above and one or more optical fibres for connecting the pair of optical modules to each other.

Other preferred and- optional features will be apparent from the following descriptions.

BRIEF DESCRIPTION OF DRAWINGS

Embodiments of the invention will now be described, by way of example, with reference to the accompanying drawings, in which.

BEST MODE OF CARRYING OUT THE INVENTION

Figure 1:
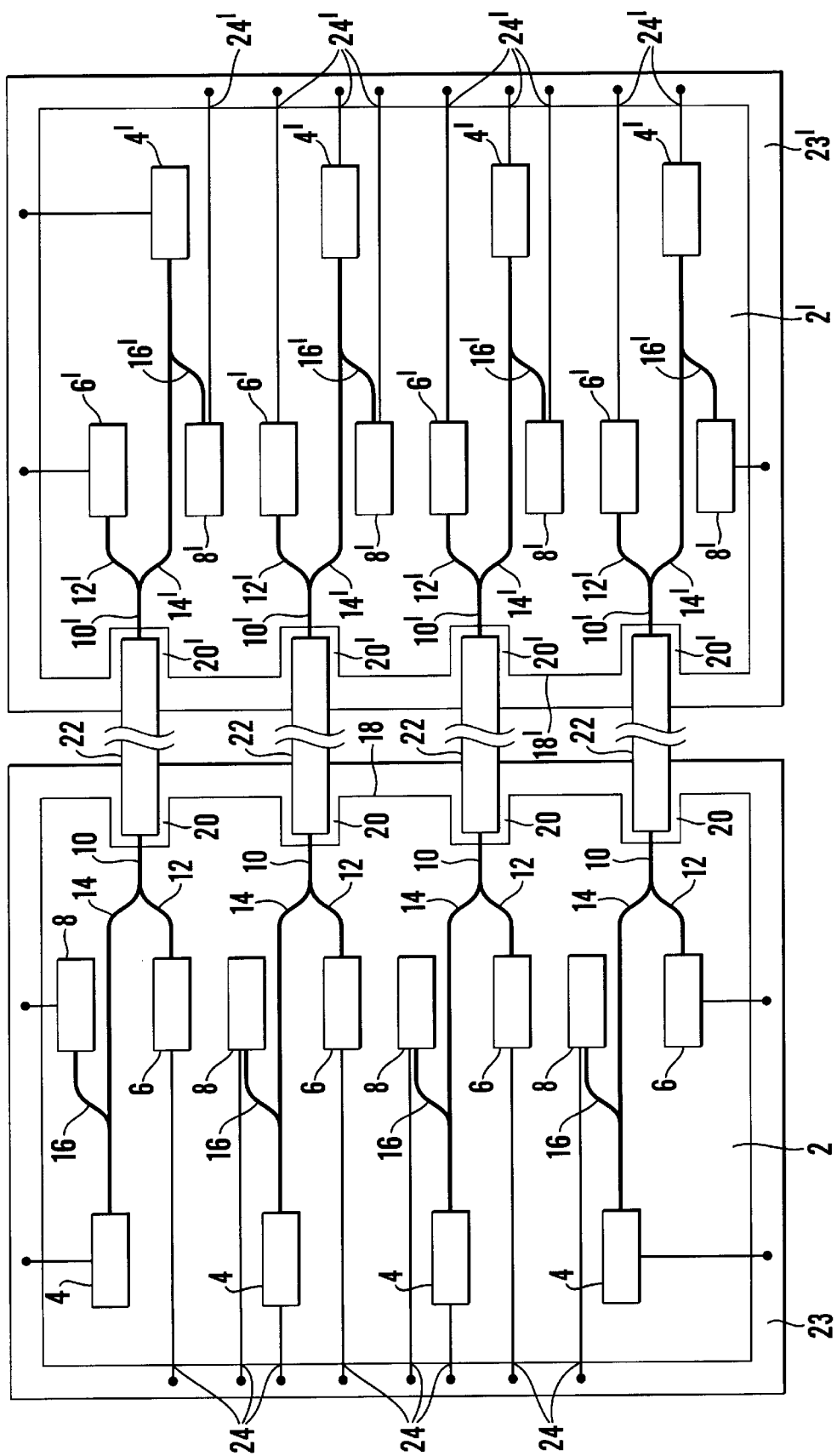
FIG. 1 is a schematic representation, of first embodiment of the present invention.

Referring to the drawings, FIG. 1 shows two silicon-on-insulator chips 2 and 2'. Each chip 2, 2' carries four transceivers, and each of those four transceivers is half of a pair of transceivers, the other half of the pair being on the other one of the chips. Each transceiver comprises a laser 4, a receiver photodiode 6, a monitor photodiode 8, and various rib waveguides. The lasers and photodiodes are hybridised onto the chips 2, 2'. Rib waveguides are formed in the upper silicon layer of the chip 2, 2' and connect the various components of the transceivers. Each one of each pair of transceivers comprises a branched waveguide. Considering any one of the transceivers on the silicon chip 2, it comprises a branched waveguide having a stem 10, a first branch 14, communicating the stem 10 with the laser 4, and a second branch 12 communicating the stem 10 with the receiver photodiode 6. Another waveguide 16 connects the monitor photodiode 8 with the branch 14 leading to the laser 4. Similarly, on the second silicon chip 2' like parts are provided indicated by prime notation.

Each silicon chip 2, 2' comprises a side edge 18, 18'. V-grooves 20, 20' providing fibre connection means, are provided at the side edge 18 of each chip 2, 2'. A ribbon comprising a plurality of optical fibres 22 extends between the side edges 18, 18' so that the fibres 22 communicate between stems 10 and 10' of the branched rib waveguides of respective ones of each pair of transceivers.

The transceivers on each of the chips 2, 2' are preferably arranged so as to be substantially parallel to each other, i.e. so the stems 10 and the stems 10' extend parallel to each other to the connection means 20, 20' at the respective side edges 18, 18' to simplify fabrication of the circuits.

The lasers 4, and receiver photodiodes 6 on chip 2 are in electrical contact with a first electrical circuit board 23 via electrical connections 24 and similarly photodiodes 6' and lasers 4' on chip 2' are in electrical contact with a second electrical circuit board 23' via electrical connections 24'. Thus, considering a single pair of transceivers on the chips, electrical data from the first electrical circuit board 23 is converted to an optical signal, by laser 4, and transmitted via branch 14 and then stern 10 to fibre 22, into stem 10' on the other chip 2', through branch 12' to photodiode 6' on chip 2'. This converts the transmitted optical signal back to an electrical signal for transmission to the second electrical circuit board 23'. Hence, a point to point connection between two electrical circuit boards 23, 23' is provided. Traffic can also pass in the opposite direction, i.e. from laser 4' on chip 2' to photodiode 6 on chip 2. Forward and reverse traffic passes along the same fibre 22, i.e. it is bi-directional. Similarly, data can be passed between other pairs of transceivers on the chips, in each case bi-directionally along a single fibre.

The monitor diodes 8, 8' are connected to power monitor circuits (not shown) to monitor the power output of the respective laser 4,4'.

Up to ten or twelve transceivers would typically be integrated on each chip (when bi-directional fibre transmission is used) or up to five or six transceivers (when uni-directional transmission is received). More transceivers could be integrated on a single chip but fibre ribbons presently used are restricted to ten or twelve fibres due to the fibre ribbon connector technology. More than one fibre ribbon may, however, be used.

Figure 2:
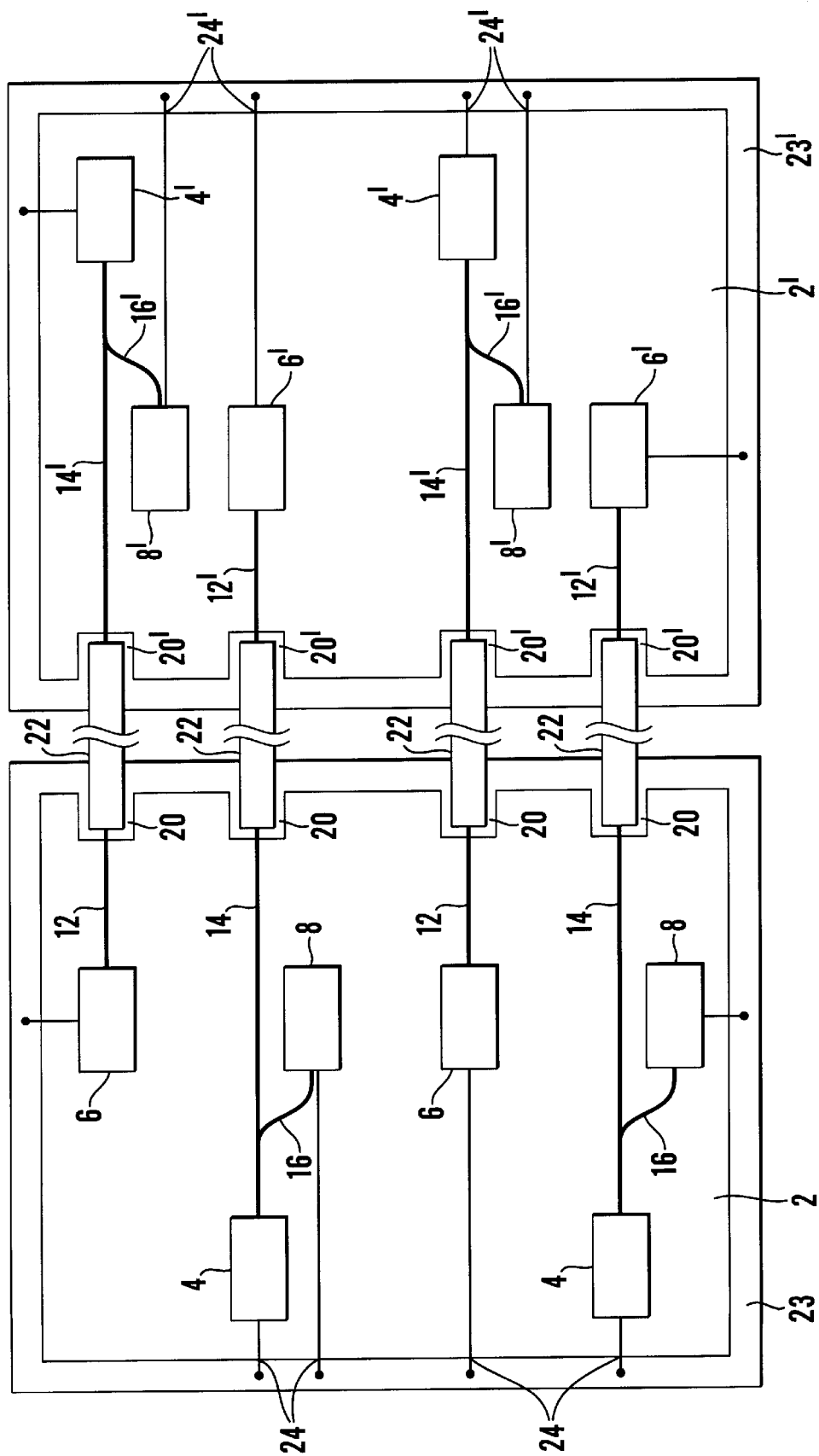
FIG. 2 is a schematic representation of a second embodiment of the invention.

FIG. 2 shows a second embodiment of the invention in which uni-directional optical fibre connections are provided between two silicon-on-insulator chips. The components shown in FIG. 2 are given the same reference numerals as the corresponding components shown in FIG. 1. The arrangement is similar to that of FIG. 1 except that the rib waveguides 12 and 14 connect the photodiodes 6 and lasers 4, respectively, to separate optical fibres 22 rather than communicating with a single optical fibre for bi-directional communication between the chip 2, 2'.

Figure 3:
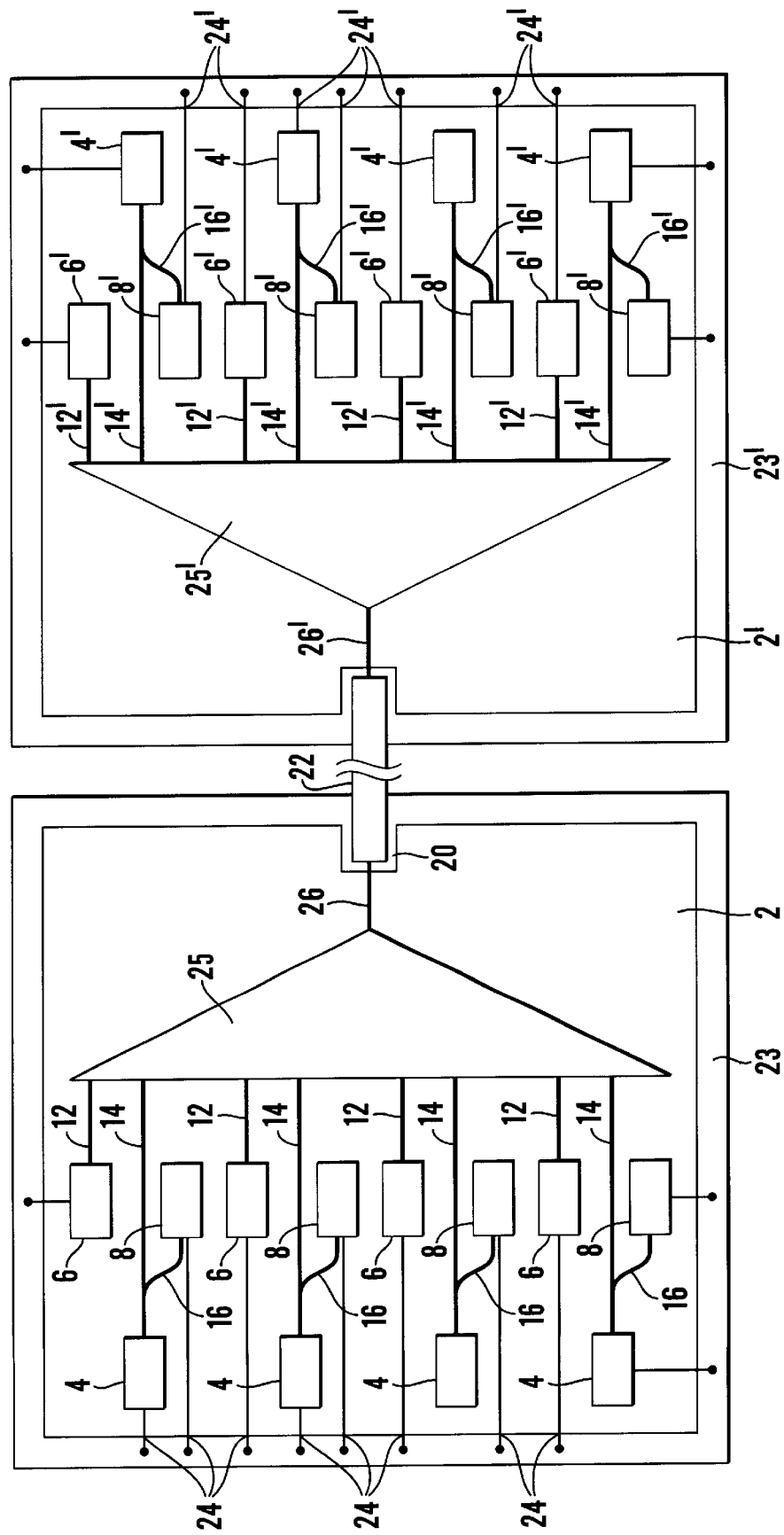
FIG. 3 is a schematic representation of a third embodiment of the invention.

FIG. 3 shows a third embodiment of the invention in which wavelength division multiplexing (WDM) means 25 are used so the light signals from a plurality of lasers 4, each producing an output of a different wavelength, can be transmitted by a single optical fibre 22 between two chips 2, 2'. The WDM means 25 connects to the fibre 22 by a single rib waveguide 26 if the optical fibre 22 is used to transmit bidirectional signals. The WDM means 25 also acts to de-multiplex the signals received from the fibre 22 and direct them to the appropriate photodiode 6, according to the wavelength of the received signal. The laser 4 and associated photodiode 6 on each chip may operate on the same wavelength and be connected to the WDM means 25 via a Y-junction (similar to the connection of the lasers and photodiodes to the fibres in FIG. 1) or they may operate on different wavelengths (to reduce cross-talk between the photodiodes and the laser). In this case, they may have separate connections to the WDM means 25 as shown in FIG. 3. In a further alternative, each transceiver unit (laser 4 and photodiodes 6, 16) may comprise a multiwavelegth transceiver as disclosed in U.S. Ser. No. 09/083,175. The output of each tranceiver may be connected to the other chip by separate optical fibres or the outputs may be multiplexed onto a single fibre using WDM means as shown in FIG. 3.

As mentioned in U.S. Ser. No. 09/083,175, the wavelength multiplexing and de-multiplexing means may comprise a transmission or reflection grating, preferably chirped, which may be formed by a series of spaced apart recesses etched In the silicon layer of the silicon-on-insulator chip.

In a further arrangement (not shown) separate WDM means may be used for the outgoing signals and the received signals and two, uni-directional connections provided between the respective WDM means on chips 2 and 2' in a manner analagous to the arrangement shown In FIG. 2.

Figure 4:
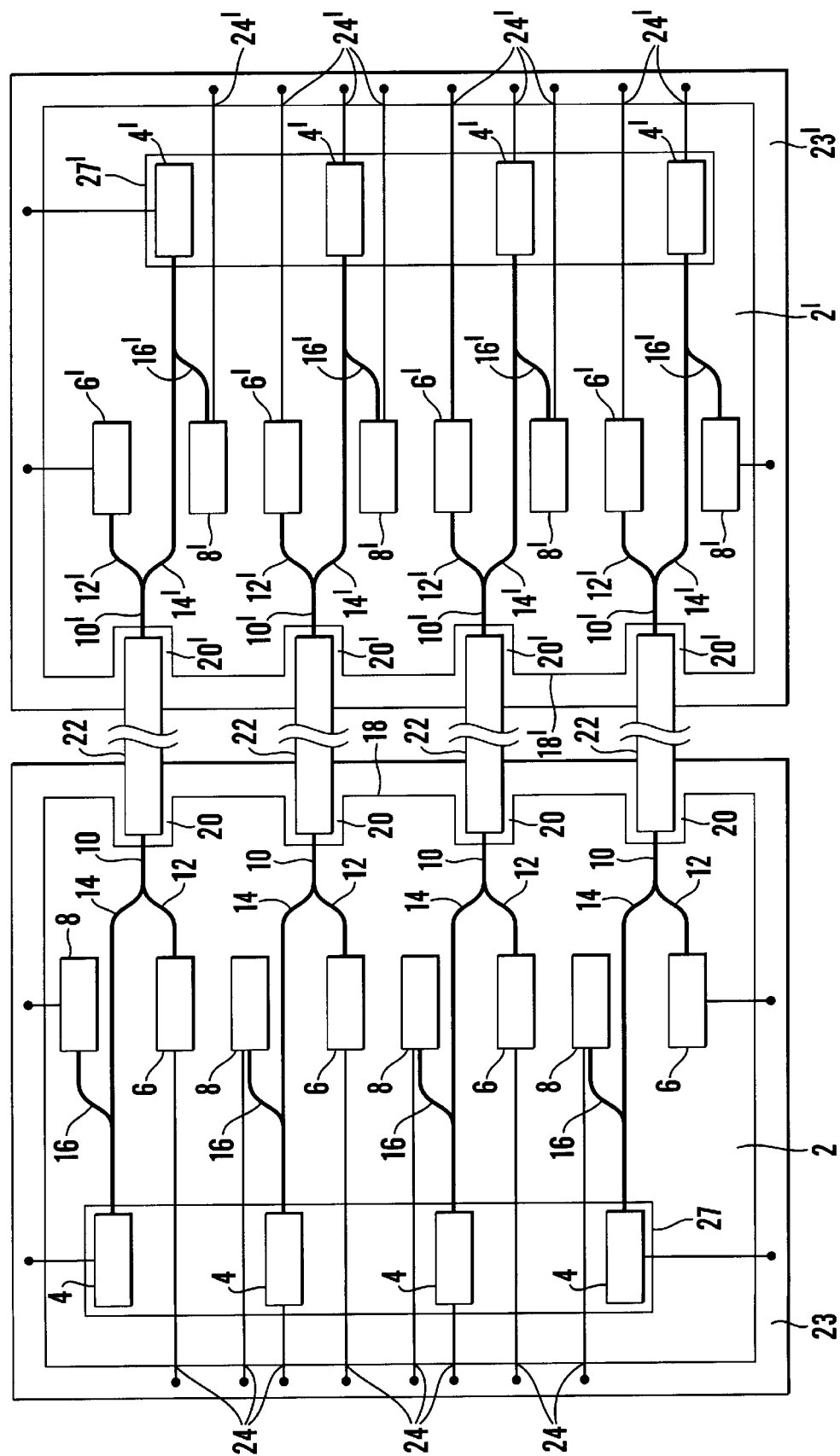
FIG. 4 is a schematic representation of a fourth embodiment of the invention.

FIG. 4 shows a similar arrangement to that shown in FIG. 1 but with the individual lasers 4 replaced by a laser bar 27. Laser diodes are typically formed on a semi-conductor chip and the chip divided into individual sections each comprising one laser after fabrication of the lasers. In the arrangement illustrated in FIG. 4, a row of lasers is provided on a strip or bar taken from the semi-conductor chip so they are provided on a common substrate. The laser bar 27 is hybridised onto the silicon-on-insulator chip in a similar manner to the individual lasers 4 but the advantage of using a laser bar is that the lasers thereon are spaced at a pre-set distance from each other. Also, the reduction in the number of components, simplifies fabrication of the device. Such a laser bar may also be used in the other embodiments described above.

What is claimed is:

1. A method of providing a point to point connection between two electrical circuit boards comprising:
   (i) providing a pair of optical transceivers, each formed on a silicon-on-insulator chip and each being in electrical contact with one of the said circuit boards, each optical transceiver comprising:
       (a) a branched rib waveguide comprising a common stem and first and second branches extending from the common stem;
       (b) fibre connection means for receiving an optical fibre, and being in communication with the stem of the branched rib waveguide;
       (c) a light source for providing optical signals, the light source being in communication with the first branch of the branched rib waveguide; and
       (d) a light receiver in communication with the second branch of the branched rib waveguide; and
   (ii) providing a single optical fibre linking the stem of the branched rib waveguide of the first transceiver to the stem of the branched rib waveguide of the second transceiver.

2. A method according to claim 1, wherein each transceiver comprises a monitor light receiver in communication with the light source via another optical waveguide.

3. A method according to claim 1, wherein the fibre connection means comprises a groove formed In the silicon-on-insulator chip.

4. A method according to claim 1, the method comprising providing a plurality of said pairs of optical transceivers, one of each pair being provided on a first silicon-on-insulator chip, and the other of each pair being provided on a second, silicon-on-insulator chip.

5. A method according to claim 4, additionally comprising the step of providing a ribbon comprising a plurality of optical fibres, each of the pairs of transceivers being connected by respective ones of the fibres in the ribbon.

6. An optical module comprising a plurality of optical transceivers formed on a silicon-on-insulator, each transceiver comprising:
   (a) a branched rib waveguide comprising a common stem and first and second branches extending from the common stem;
   (b) fibre connection means comprising a groove formed in the chip for receiving an optical fibre, and being in communication with the stem of the branched rib waveguide;
   (c) a light source for providing optical signals, the light source being in communication with the first branch of the branched rib waveguide; and
   (d) a light receiver in communication with the second branch of the branched rib waveguide;
wherein the stems of the plurality of transceivers extend across the chip to the fibre connection means which are provided at spaced apart locations along an edge of the chip.

7. An optical module according to claim 6. in combination with an optical fibre ribbon, wherein respective ones of the fibres of the ribbon are located in respective fibre connection means provided along the edge of the chip.

8. A method of making a point to point connection between two electrical circuit boards comprising:
   (i) providing a pair of optical transceivers, each formed on a silicon-on-insulator chip and each being in electrical contact with one of the said circuit boards, each optical transceiver comprising:
       (a) two rib waveguides;
       (b) two fibre connection means for receiving optical fibres, and being in communication with respective ones of the rib waveguides;
       (c) a light source for providing optical signals, the light source being in communication with the first rib waveguide; and
       (d) a light receiver in communication with, the second rib waveguide; and
   (ii) providing two optical fibres, one linking the first rib waveguide of the first transceiver to the second rib waveguide of the second transceiver, and the other linking the second rib waveguide of the first transceiver to the first rib waveguide of the second transceiver.

9. An optical module comprising a plurality of optical transceivers formed on a silicon-on-insulator chip, each transceiver comprising:
   (a) two rib waveguides;
   (b) two fibre connection means formed in the chip for receiving an optical fibre, and being in communication with respective ones of the rib waveguides;
   (c) a light source, for providing optical signals, the light source being in communication with the first rib waveguide; and
   (d) a light receiver in communication with the second rib waveguide;
wherein the rib waveguides of the transceivers extend across the chip to the fibre connection means which are provided at spaced apart locations along an edge of the chip.

10. A method according to claim 1, wherein wavelength division multiplexing means are provided on the chip to enable a plurality of signals, each of a different wavelength, to be transmitted over the or each optical fibre.

11. A method according to claim 1, wherein a plurality of light sources are provided on each chip, the light sources being fabricated on a common substrate which is mounted on the chip.

12. A module according to claim 6, wherein wavelength division multiplexing means are provided on the chip to enable a plurality of signals, each of a different wavelength, to be transmitted over the or each optical fibre.

13. A module according to claim 6, wherein a plurality of light sources are provided on each chip, the light sources being fabricated on a common substrate which is mounted on the chip.

14. A pair of optical modules as claimed in claim 6, a first module of the pair being connected to a first circuit board and a second module of the pair being connected to a second circuit board and the pair of optical modules being connected to each other by one or more optical fibres.

15. A kit of parts comprising at least one pair of optical modules as claimed in claim 6 and one or more optical fibres for connecting the pair of optical modules to each other.

* * * * *